Patented Jan. 3, 1933

1,893,296

UNITED STATES PATENT OFFICE

WILLIAM C. LILLIENDAHL, OF MONTCLAIR, AND FRANK H. DRIGGS, OF BLOOMFIELD, NEW JERSEY, ASSIGNORS TO WESTINGHOUSE LAMP COMPANY, A CORPORATION OF PENNSYLVANIA

PREPARATION OF METAL PHOSPHIDES

No Drawing. Application filed November 27, 1929. Serial No. 410,245.

This invention relates to the preparation of metal phosphides and more particularly to the preparation of phosphide compounds of the rare refractory metals zirconium, thorium, uranium, titanium and the like.

One of the objects of this invention is to provide a method of producing substantially pure rare refractory metal phosphide compounds.

Another object of this invention is to prepare a substantially pure rare refractory metal phosphide compound.

Other objects and advantages will become apparent as the invention is more fully disclosed.

In accordance with the objects of our invention we have found that the phosphide compounds of the rare refractory metals may be prepared by the direct union of the finely divided metal with phosphorus at elevated temperatures. The combining reaction is exothermic and the evolved heat energy incandesces the component reacting elements to relatively high temperatures thereby accelerating the combining reaction. At these higher temperatures partial decomposition of the metal phosphide compound ensues which may be avoided by maintaining the reacting materials under a vapor pressure of phosphorus which is substantially above the equilibrium pressure of the metal phosphide compound at the temperature obtained.

It is difficult to determine the equilibrium pressures of the phosphorus-metal phosphide compound and we have found that the decomposition of the metal phosphide compound as a result of the increased temperatures obtained through the action of the exothermic heat energy in the combining reaction may be substantially eliminated by enclosing the metal and phosphorus materials in an evacuated hermetically sealed container prior to initiating the combining reaction.

We have also found that for the best results it is essential to employ red phosphorus in the forming of the metal phosphide compounds by the present invention. Red phosphorus has a melting point of approximately 700° C. The exact melting point is dependent upon the conditions of heating, that is, the manner of and rate of heating, and the atmosphere.

When the heating of red phosphorus is conducted in vacuo an appreciable vapor pressure of phosphorus is obtained at relatively low temperatures which on condensing is converted to the yellow form of phosphorus having a melting point of 44° C. and a boiling point of approximately 290° C. It is essential, therefore, in the practice of the present invention that the rate of heating of the admixed rare refractory metal powder and red phosphorus to the temperature at which interaction and combination to form the desired rare metal phosphide compounds, be substantially rapid so as to avoid undue volatilization of the red phosphorus compound from the admixed materials.

In order to facilitate the interaction of these materials and to reduce the vaporization of the phosphorus from the admixture during the heating up of the materials to the combining temperature, we have found that the rare refractory metal powders and the phosphorus should be compressed together or compacted into a substantially adherent mass before heating.

As a specific embodiment of the practice of our invention we will set forth the method we employ in the preparation of zirconium phosphide, although the phosphides of other rare refractory metals, such as thorium, uranium, titanium, may be prepared in an analogous manner.

The rare refractory metal powder employed in the practice of this invention may be prepared in accordance with the process set forth in U. S. Patent 1,704,257 issued March 5, 1929 to John W. Marden, et al., which patent is assigned to the same assignee as the present invention; or may be prepared by one of the electrolytic methods disclosed in copending application Serial No. 275,264 filed May 4, 1928, application Serial No. 277,096 filed May 11, 1928, application Serial No. 316,624 filed February 1, 1928 by Frank H. Driggs, application Serial No. 351,451 filed March 30, 1929 and application Serial No. 309,682 filed October 1, 1928 by Frank H. Driggs et al., which applications are also assigned to the same assignee as the present invention.

The Frank H. Driggs co-inventor of the present invention is the same Frank H. Driggs of the above copending applications.

An intimate admixture of zirconium metal powder of approximately 200 mesh with powdered or granulated red phosphorus in the relative proportions of three parts zirconium to one part phosphorus is made and the admixture compacted by any convenient means, such as a jack screw press, into a coherent mass or pellet. A pressure of approximately 500 pounds per square inch is employed in the compacting. This pressure is arbitrary and may be increased or decreased within rather wide limits depending upon the metal powder particle size, the relative proportions of material employed, the component materials and other factors.

The pressed admixture which may be in the form of a pellet or square ingot is placed in a refractory metal container, such as a molybdenum boat and inserted into a suitably dimensioned quartz tube which is closed at one end and connected at the other end in any convenient manner to a high vacuum system such as mercury diffusion pumps, molecular pumps and the like exhaust apparatus which is capable of producing within the quartz tube a pressure of from 10 to 15 microns. Means should be provided intermediate the quartz container and the evacuating apparatus for preventing the diffusion of deleterious vapors from the evacuating apparatus to the quartz container. Such means may comprise a suitably designed liquid air trap. Means should also be provided for hermetically sealing the quartz tube container when the pressure has been reduced to the desired 10 to 15 microns.

The evacuated quartz tube container and contained molybdenum boat within which is disposed the compacted pellet of zirconium metal powder and powdered red phosphorus is then rapidly heated by any convenient means to the reaction temperature of the zirconium metal and phosphorus, which is approximately 600 to 1000° C. depending upon the state of subdivision of the metal powder and is maintained at this temperature for an appreciable period of time, dependent upon the relative combining masses, to insure the entire conversion of the metal powder to phosphide. The actual temperature of the combining materials will be appreciably higher than 600 to 1000° C. due to the exothermic evolution of heat from the combining materials.

At the conclusion of the desired time interval the quartz tube container and contents are permitted to cool to room temperature before opening to atmospheric pressure.

By employing a relatively large excess of phosphorus over that theoretically required for the forming of the metal phosphide compound a relatively high vapor pressure of phosphorus may be maintained within the evacuated container during the entire heating process and thermal decomposition of the metal phosphide compound at the elevated forming temperature thereby substantially prevented.

The molybdenum boat and contents are removed from the quartz container and the gray partially sintered phosphide material is ground to a fine powder and treated, such as by washing in alcohol, ether, or by distillation to remove excess uncombined phosphorus. The resulting product is substantially pure rare metal phosphide compound.

The specific process herein set forth is susceptible to many modifications and refinements in both process and materials without substantially departing from the nature of our invention, and such modifications and departures are anticipated as fall within the scope of the following claims:

What is claimed is:

1. The method of preparing rare refractory metal phosphide compounds which comprises heating an admixture of finely divided metal and phosphorus, the latter component of the admixture being in large excess of combining weights, in a sealed container to elevated temperatures approximating the combining temperature of the metal and phosphorus.

2. The method of preparing zirconium phosphide which comprises heating an admixture of zirconium metal powder and phosphorus to a reacting temperature in a vapor pressure of phosphorus substantially greater than the equilibrium vapor pressure of zirconium phosphide.

3. The method of preparing zirconium phosphide which comprises intimately admixing zirconium metal powder and a large excess of phosphorus and heating the admixture to about 600° C. to 1000° C. in an hermetically sealed evacuated container.

4. The method of preparing zirconium phosphide which comprises intimately admixing zirconium metal powder and phosphorus, compacting the admixture and heating the compacted admixture to a temperature of about 600° to 1000° C. in a pressure of phosphorus substantially greater than the decomposition pressure of the zirconium phosphide at that temperature.

5. The method of preparing zirconium phosphide which comprises intimately admixing zirconium metal powder and phosphorus, the latter component being in large excess to that theoretically required, compacting the admixture, incorporating the compacted admixture in an hermetically sealed evacuated container, and heating the container and contents to temperatures in excess of approximately 600° C.

6. The method of preparing zirconium phosphide which comprises admixing about three parts zirconium metal powder with about one part finely divided red phosphorus, compacting the admixture, incorporating the compacted admixture in an hermetically sealed evacuated container and heating the container and contents to elevated temperatures approximating 600° C. to 1000° C. for a substantial interval of time.

In testimony whereof, we have hereunto subscribed our names this 26th day of November 1929.

WILLIAM C. LILLIENDAHL.
FRANK H. DRIGGS.